(12) United States Patent
Fujiwara et al.

(10) Patent No.: US 12,098,229 B2
(45) Date of Patent: Sep. 24, 2024

(54) RESIN COMPOSITION FOR PLATING, AND PLATED MOLDED ARTICLE

(71) Applicant: NIPPON A&L INC., Osaka (JP)

(72) Inventors: Takayoshi Fujiwara, Takaishi (JP); Nana Matsumoto, Takaishi (JP)

(73) Assignee: NIPPON A&L INC., Osaka (JP)

( * ) Notice: Subject to any disclaimer, the term of this patent is extended or adjusted under 35 U.S.C. 154(b) by 0 days.

(21) Appl. No.: 17/727,446

(22) Filed: Apr. 22, 2022

(65) Prior Publication Data

US 2022/0251271 A1 Aug. 11, 2022

Related U.S. Application Data

(63) Continuation of application No. 16/315,855, filed as application No. PCT/JP2017/024593 on Jul. 5, 2017, now abandoned.

(30) Foreign Application Priority Data

Jul. 8, 2016 (JP) ................................. 2016-136315

(51) Int. Cl.
| | |
|---|---|
| C08L 25/12 | (2006.01) |
| C08F 212/10 | (2006.01) |
| C08F 220/44 | (2006.01) |
| C08F 253/00 | (2006.01) |
| C08L 51/04 | (2006.01) |
| C08L 69/00 | (2006.01) |
| C25D 5/56 | (2006.01) |

(52) U.S. Cl.
CPC .......... *C08F 253/00* (2013.01); *C08F 212/10* (2013.01); *C08F 220/44* (2013.01); *C08L 25/12* (2013.01); *C08L 51/04* (2013.01); *C08L 69/00* (2013.01); *C25D 5/56* (2013.01); *C08L 2205/035* (2013.01)

(58) Field of Classification Search
CPC ........... C08L 25/12; C08L 69/00; C08L 51/04
See application file for complete search history.

(56) References Cited

U.S. PATENT DOCUMENTS

| | | | | |
|---|---|---|---|---|
| 4,068,064 | A * | 1/1978 | Platt ...................... | C08F 212/04 |
| | | | | 526/194 |
| 5,543,182 | A | 8/1996 | Joshi et al. | |
| 5,723,526 | A | 3/1998 | Nagasawa | |
| 5,725,640 | A | 3/1998 | Joshi et al. | |
| 6,503,628 | B1 | 1/2003 | Janarthanan et al. | |
| 9,725,591 | B2 | 8/2017 | Tezuka et al. | |
| 2010/0276289 | A1 | 11/2010 | Tezuka et al. | |
| 2013/0221293 | A1 | 8/2013 | Shirakawa et al. | |
| 2015/0072149 | A1 | 3/2015 | Motegi et al. | |
| 2017/0107373 | A1 | 4/2017 | Matsuyama | |

FOREIGN PATENT DOCUMENTS

| | | | |
|---|---|---|---|
| AU | 729595 | * | 10/1998 |
| AU | 729595 | B2 † | 10/1998 |
| AU | 199859377 | B2 | 10/1998 |
| CN | 1305512 | A | 7/2001 |
| CN | 1541248 | A | 10/2004 |
| CN | 101910301 | A | 12/2010 |
| CN | 102146203 | A | 8/2011 |
| CN | 102719076 | A | 10/2012 |
| EP | 0869149 | A2 | 10/1998 |
| EP | 1445281 | A1 | 8/2004 |
| EP | 1445281 | B1 | 2/2018 |
| JP | 7-11487 | A | 1/1995 |
| JP | 8-269313 | A | 10/1996 |
| JP | 10-279769 | A | 10/1998 |
| JP | 11-61425 | A | 3/1999 |
| JP | 2002-528589 | A | 9/2002 |
| JP | 2003-327817 | A | 11/2003 |

(Continued)

OTHER PUBLICATIONS

Indian Office Action for Indian Application No. 201917000426, dated Dec. 15, 2020, with English translation.
Indonesian Office Action for Indonesian Application No. PID201900835, dated Nov. 2, 2020, with English translation.
International Search Report for International Application No. PCT/JP2017/024593, dated Sep. 5, 2017.
"Injection Molding Encyclopedia," Encyclopedia Publishing Center Industry Research Institute, 2002, pp. 60-61 (13 pages total), with English translation.
Aotani et al., "Metal Plating Technology (4) Plastic Plating," Metal Surface Industry Compendium, vol. 5, 1972, pp. 27-31 (21 pages total), with English translation.

(Continued)

*Primary Examiner* — Margaret G Moore
(74) *Attorney, Agent, or Firm* — Birch, Stewart, Kolasch & Birch, LLP

(57) ABSTRACT

To provide a resin composition for plating and a plated molded article which are excellent in impact resistance and fluidity and which satisfy plating adhesion strength, plating deposition rate and thermal cycle resistance in a well-balanced manner. A resin composition for plating, containing a polycarbonate resin (A), a graft copolymer (B) and a copolymer (C), wherein the resin composition satisfies the following conditions (1) to (5):
(1) a content of the polycarbonate resin (A) is 20 to 60% by mass based on 100% by mass of a total of (A), (B) and (C);
(2) the graft copolymer (B) is a graft copolymer obtained by graft polymerization of a rubbery polymer and a monomer component including an aromatic vinyl-based monomer;
(3) the copolymer (C) is a copolymer obtained by polymerization of a monomer component including an aromatic vinyl-based monomer and a vinyl cyanide-based monomer;
(4) a content of the rubbery polymer is 7 to 20% by mass relative to the resin composition; and
(5) a content of an oligomer component is less than 1% by mass relative to the resin composition.

15 Claims, No Drawings

(56) References Cited

FOREIGN PATENT DOCUMENTS

| JP | 2006-169461 | A | 6/2006 |
| JP | 2007-197695 | A | 8/2007 |
| JP | 2014-74159 | A | 4/2014 |
| JP | 2015-108075 | A | 6/2015 |
| WO | WO 00/24829 | A1 | 5/2000 |
| WO | WO 2015/190237 | A1 | 12/2015 |

OTHER PUBLICATIONS

Kaoru Aotani, Metal Plating Technology (4) Plastic Plating, Metal Surface Industry Compendium vol. 5, pp. 27-31, 1972.†
Injection Molding Encyclopedia, published by Encyclopedia Publishing Center Industry Research Institute, pp. 60-61, 2002.†

\* cited by examiner
† cited by third party

RESIN COMPOSITION FOR PLATING, AND PLATED MOLDED ARTICLE

CROSS-REFERENCE TO RELATED APPLICATIONS

This application is a Continuation application of application Ser. No. 16/315,855, filed on Jan. 7, 2019, and now abandoned, which is the National Phase under 35 U.S.C. § 371 of International Application No. PCT/JP2017/024593, filed on Jul. 5, 2017, which claims the benefit under 35 U.S.C. § 119(a) to Patent Application No. 2016-136315, filed in Japan on Jul. 8, 2016, all of which are hereby expressly incorporated by reference into the present application.

TECHNICAL FIELD

The present invention relates to a resin composition for plating and a plated molded article which are excellent in impact resistance and fluidity and which satisfy plating adhesion strength, plating deposition rate and thermal cycle resistance in a well-balanced manner.

BACKGROUND ART

A composition including a polycarbonate resin and an ABS-based resin (hereinafter, designated as "PC/ABS-based resin") is excellent in impact resistance, heat resistance and moldability, and thus is used in various applications including automobile parts, home appliances, and office equipment parts. In particular, automobile parts and the like tend to be increased in sizes and tend to be designed so as to have more complicated shapes. In addition, molded articles tend to be designed so as to be thinner in thickness for the purpose of a reduction in automobile weight, and therefore a material excellent in performances such as moldability, impact resistance and heat resistance is demanded. As one option, a PC/ABS-based resin may be adopted in some cases. Additionally, a PC/ABS-based resin provided with an ornament plate is often used for parts which are demanded to have designated metallic appearances and be reduced in weights, in such applications. Conventionally, a plate processing step of a PC/ABS-based resin has been mainly a so-called catalyst-accelerator method generally including steps of degreasing, chemical etching, neutralization, catalyst imparting, activation, electroless plating, acid activation, electroplating, and the like. An electroless plating solution for use in the method, for example, an electroless nickel plating solution, however, contains hypophosphite as a reducing agent and the hypophosphite has an effect on environmental problems, and therefore the following problems are caused: measures to phosphorus regulations need to be made, effluent regulations are very critical due to high-COD wastewater, and the cost for treating wastewater is very increased. An additional problem is that the work environment is deteriorated due to the odor of ammonia used for pH adjustment. Moreover, formalin is also used as a reducing agent in an electroless copper plating solution, but the use of formalin is pointed out to have the problem of having adverse effects on various health and environmental problems.

Furthermore, a strong complexing agent for solubilizing copper ions in an alkaline solution is used in the plating solution, and there are various problems, for example, a very increased cost for treating wastewater for removal of metal ions in a treatment of wastewater of the plating solution.

From the viewpoint of demands for measures to laws and regulations on health and global environment and securement of a safe work environment in such a catalyst-accelerator method, a plating method using no electroless plating bath (referred to as "direct plate method", "direct plating method", or the like) has been studied to be put into practical use, as one part of improvements in plating methods. For example, Japanese Patent Laid-Open No. 7-11487 (Patent Literature 1) and Japanese Patent Laid-Open No. 11-61425 (Patent Literature 2) and the like disclose a Pd—Sn colloid catalyst method.

While a PC/ABS-based resin used in a conventional resin plating method may also be commonly used for such a direct plating method in some cases, the PC/ABS-based resin tends to be hardly deposited on the surface of a molded article in an electrolytic copper plating step of the direct plating method, to easily cause an unplated portion designated as a skip, and a problem is that such a tendency is extremely highly seen particularly in a molded article having a complicated product shape. In addition, a plated molded article is demanded which can maintain a good plating appearance even when used in a wide temperature fluctuation environment (hereinafter, referred to as "thermal cycle resistance").

As a PC-based resin composition for electroless plating, excellent in electroless plating characteristics, Japanese Patent Laid-Open No. 8-269313 (Patent Literature 3) discloses a resin composition for electroless plating where the resin composition includes a polycarbonate-based resin and a copolymer which is formed from an aromatic vinyl monomer, a vinyl cyanide monomer and a rubbery polymer and whose graft ratio is defined, but such a resin composition cannot sufficiently satisfy plating deposition rate in the direct plating method.

As a resin composition for direct plating, excellent in direct plating properties, in particular, extensibility of electroplated copper (plating deposition rate), and excellent in physical properties such as moldability, impact resistance and heat resistance, Japanese Patent Laid-Open No. 2003-327817 (Patent Literature 4) discloses a resin composition including a graft copolymer formed from a rubbery polymer having an average particle size in a certain range, an aromatic vinyl compound, a vinyl cyanide compound and other monovinyl compound, and a polycarbonate resin, but such a resin composition cannot sufficiently satisfy thermal cycle resistance as a plated product, due to failures in continuous formation of a resin molded article for plating.

CITATION LIST

Patent Literature

Patent Literature 1: Japanese Patent Laid-Open No. 7-11487
Patent Literature 2: Japanese Patent Laid-Open No. 11-61425
Patent Literature 3: Japanese Patent Laid-Open No. 8-269313
Patent Literature 4: Japanese Patent Laid-Open No. 2003-327817

SUMMARY OF INVENTION

Technical Problem

An object of the present invention is to provide a resin composition for plating and a plated molded article which are excellent in impact resistance and fluidity and which satisfy plating adhesion strength, plating deposition rate and thermal cycle resistance in a well-balanced manner. That is, an object of the present invention is to provide a resin composition for plating, which is excellent in impact resistance and fluidity and which satisfies plating adhesion strength, plating deposition rate and thermal cycle resistance in a well-balanced manner after molding, and to provide a molded article which satisfies plating adhesion strength, plating deposition rate and thermal cycle resistance in a well-balanced manner.

Solution to Problem

The present inventors have made intensive studies, and as a result, have found that the above problems can be solved by allowing a polycarbonate resin, a graft copolymer and a copolymer to be contained in specified amounts and defining the content of an oligomer component in a resin composition, thereby leading to completion of the present invention.

That is, the present invention is configured from the following [1] to [5].

[1] A resin composition for plating, containing a polycarbonate resin (A), a graft copolymer (B) and a copolymer (C), wherein the resin composition satisfies the following conditions (1) to (5):

(1) a content of the polycarbonate resin (A) is 20 to 60% by mass based on 100% by mass of a total of (A), (B) and (C);

(2) the graft copolymer (B) is a graft copolymer obtained by graft polymerization of a rubbery polymer and a monomer component including an aromatic vinyl-based monomer;

(3) the copolymer (C) is a copolymer obtained by polymerization of a monomer component including an aromatic vinyl-based monomer and a vinyl cyanide-based monomer;

(4) a content of the rubbery polymer is 7 to 20% by mass relative to the resin composition; and (5) a content of an oligomer component is less than 1% by mass relative to the resin composition.

[2] The resin composition for plating according to [1], wherein the content of the polycarbonate resin (A) is 30 to 50% by mass based on 100% by mass of the total of (A), (B) and (C).

[3] The resin composition for plating according to [1] or [2], wherein the content of the rubbery polymer is 10 to 15% by mass relative to the resin composition.

[4] The resin composition for plating according to any one of [1] to [3], wherein a content of the vinyl cyanide-based monomer forming the copolymer (C) is 30 to 40% by mass relative to the copolymer (C).

[5] A plated molded article where a molded article obtained by molding the resin composition for plating according to any one of [1] to [4] is plated.

Advantageous Effects of Invention

According to the present invention, there can be provided a resin composition for plating and a plated molded article which are excellent in impact resistance and fluidity and which satisfy plating adhesion strength, plating deposition rate and thermal cycle resistance in a well-balanced manner. The plating method here used is particularly suitably a direct plating method.

DESCRIPTION OF EMBODIMENTS

Hereinafter, the present invention will be described in detail.

The resin composition for plating of the present invention contains a polycarbonate resin (A), a graft copolymer (B) and a copolymer (C).

The polycarbonate resin (A) is a polymer obtained by a phosgene method of reacting various dihydroxydiaryl compounds with phosgene, or a transesterification method of reacting a dihydroxydiaryl compound with carbonate such as diphenyl carbonate, and representative examples include a polycarbonate resin produced from 2,2-bis(4-hydroxyphenyl) propane; "bisphenol A".

Examples of the dihydroxydiaryl compound include, besides bisphenol A, bis(hydroxyaryl)alkanes such as bis(4-hydroxydiphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)diphenylmethane, 2,2-bis(4-hydroxy-3-methylphenyl)propane, 1,1-bis(4-hydroxy-3-t-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane, bis(hydroxyaryl)cycloalkanes such as 1,1-bis(4-hydroxyphenyl)cyclopentene and 1,1-bis(4-hydroxyphenyl)cyclohexane, dihydroxydiaryl ethers such as 4,4'-dihydroxydiphenyl ether and 4,4'-dihydroxy-3,3'-dimethyldiphenyl ether, dihydroxydiaryl sulfides such as 4,4'-dihydroxydiphenyl sulfide and 4,4'-dihydroxy-3,3'-dimethyldiphenyl sulfide, dihydroxydiaryl sulfoxides such as 4,4'-dihydroxydiphenyl sulfoxide, and dihydroxydiaryl sulfones such as 4,4'-dihydroxydiphenyl sulfone and 4,4'-dihydroxy-3,3'-dimethyldiphenyl sulfone.

While such dihydroxydiaryl compounds are used singly or as a mixture of two or more kinds thereof, piperazine, dipiperidylhydroquinone, resorcin, 4,4'-dihydroxydiphenyls, and the like may also be further mixed therewith.

Furthermore, the dihydroxydiaryl compound and a tri- or higher hydric phenol compound shown below may be mixed and used in combination. Examples of such a tri- or higher hydric phenol include phloroglucinol, 4,6-dimethyl-2,4,6-tri-(4-hydroxyphenyl)-heptene, 4,6-dimethyl-2,4,6-tri-(4-hydroxyphenyl)-heptane, 1,3,5-tri-(4-hydroxyphenyl)benzol, 1,1,1-tri-(4-hydroxyphenyl)ethane, and 2,2-bis-[4,4-bis(4-hydroxyphenyl)cyclohexyl]propane. With respect to production of the polycarbonate resin, the mass average molecular weight of the polycarbonate resin is usually 10000 to 80000, preferably 15000 to 60000. A molecular weight modifier, a catalyst, and the like can be used, if necessary. The mass average molecular weight can be measured with polystyrene as a standard substance by gel permeation chromatography (GPC).

The graft copolymer (B) is obtained by graft polymerization of a rubbery polymer, and a monomer component including an aromatic vinyl-based monomer.

The rubbery polymer forming the graft copolymer (B) is not particularly limited, and one or more of conjugated diene-based rubber such as polybutadiene rubber, styrene-butadiene rubber (SBR) and acrylonitrile-butadiene rubber (NBR), ethylene-propylene-based rubber such as ethylene-propylene rubber and ethylene-propylene-unconjugated diene (ethylidene norbornene, dicyclopentadiene, or the like) rubber, acrylic rubber such as polybutyl acrylate rubber, and silicone-based rubber, which are obtained by any known polymerization method, can be used. The acrylic rubber also includes rubber having a core/shell structure. Examples of the rubber having a core/shell structure (described in order of core/shell) include conjugated diene-based rubber/acrylic rubber, silicone-based rubber/acrylic rubber, and hard polymer (glass transition temperature: 20° C. or more)/acrylic rubber. Examples of the hard polymer (glass transition temperature: 20° C. or more) include a polymer obtained by polymerization of a monomer containing at least one selected from an aromatic vinyl-based monomer, a vinyl cyanide-based monomer, and a (meth)acrylate-based monomer. Among them, polybutadiene rubber, styrene-butadiene rubber, ethylene-propylene-unconjugated diene rubber, conjugated diene-based rubber/acrylic rubber, silicone-based rubber/acrylic rubber, and hard polymer (glass transition temperature: 20° C. or more)/acrylic rubber are preferable. The glass transition temperature of the hard polymer can be calculated by the FOX equation.

While the mass average particle size of the rubbery polymer is not particularly limited, it is preferably 0.1 to 2.0 μm in terms of impact resistance, and thermal cycle resistance after plating, and more preferably 0.2 to 1.0 μm in terms of plating adhesion properties and plating deposition rate. It is also possible to adjust the mass average particle size with agglomeration (aggregation) of a rubbery polymer having a mass average particle size of 0.05 to 0.3 μm.

The graft copolymer (B) in the present invention is obtained by graft polymerization of a monomer component including an aromatic vinyl-based monomer to the above rubbery polymer.

The content of the rubbery polymer in the graft copolymer (B) is preferably 20 to 80% by mass, more preferably 40 to 70% by mass from the viewpoint of the balance between physical properties such as impact resistance and fluidity.

Examples of the aromatic vinyl-based monomer forming the graft copolymer (B) include styrene, α-methylstyrene, para-methylstyrene, and bromostyrene, and such monomers can be used singly or in combinations of two or more kinds thereof. In particular, styrene and α-methylstyrene are preferable.

The monomer component forming the graft copolymer (B) may further include other monomer copolymerizable with the aromatic vinyl-based monomer, examples of such other monomer include a vinyl cyanide-based monomer, a (meth)acrylate-based monomer, an amide-based monomer and an unsaturated carboxylic acid-based monomer, and such monomer components can be used singly or in combinations of two or more kinds thereof. Examples of the vinyl cyanide-based monomer can include acrylonitrile, methacrylonitrile, ethacrylonitrile, and fumaronitrile, examples of the (meth)acrylate-based monomer can include methyl (meth)acrylate, ethyl (meth)acrylate, propyl (meth)acrylate, butyl (meth)acrylate, 2-ethylhexyl (meth) acrylate, phenyl (meth) acrylate, 4-t-butylphenyl (meth)acrylate, (di) bromophenyl (meth)acrylate, and chlorophenyl (meth)acrylate, examples of the amide-based monomer can include acrylamide and methacrylamide, and examples of the unsaturated carboxylic acid-based monomer can include acrylic acid, methacrylic acid, maleic acid, fumaric acid, and itaconic acid.

The compositional ratio of the monomer subjected to graft polymerization to the rubbery polymer is not particularly limited, and is preferably a compositional ratio of 50 to 90% by mass of the aromatic vinyl-based monomer, 10 to 50% by mass of the vinyl cyanide-based monomer and 0 to 40% by mass of other copolymerizable monomer, a compositional ratio of 30 to 80% by mass of the aromatic vinyl-based monomer, 20 to 70% by mass of the (meth)acrylate-based monomer and 0 to 50% by mass of other copolymerizable vinyl-based monomer, or a compositional ratio of 20 to 70% by mass of the aromatic vinyl-based monomer, 20 to 70% by mass of the (meth)acrylate-based monomer, 10 to 60% by mass of the vinyl cyanide-based monomer and 0 to 50% by mass of other copolymerizable monomer (under the assumption that the amount of the total monomer subjected to graft polymerization to the rubbery polymer is 100% by mass).

The graft ratio of the graft copolymer (B) and the reduced viscosity of acetone-solubles are not particularly limited, and the graft ratio is preferably 20 to 150%, more preferably 30 to 100%, particularly preferably 36 to 75% from the viewpoint of the balance between physical properties such as impact resistance and fluidity. The reduced viscosity of acetone-solubles is preferably 0.2 to 1.5 dl/g, more preferably 0.3 to 1.0 dl/g.

The graft ratio and the reduced viscosity of acetone-solubles can be determined from the following.

Fractionation Method

About 2 g of the graft copolymer (B) and 60 ml of acetone are loaded into a conical flask, and dipped for 24 hours. Thereafter, centrifugation is conducted with a centrifuge at 15,000 rpm for 30 minutes, resulting in separation to a soluble fraction and an insoluble fraction. The insolubles are obtained by vacuum drying at ordinary temperature all day and all night. The solubles are obtained by precipitating an acetone-soluble fraction in methanol and drying it in vacuum at ordinary temperature all day and all night.

Graft Ratio $$\text{Graft ratio (\%)} = (X - Y)/Y \times 100$$

X: Amount (g) of acetone-insolubles after vacuum drying
Y: Amount (g) of rubbery polymer in graft copolymer
Reduced Viscosity (Dl/g) of Acetone-Solubles The acetone-solubles are dissolved in N,N-dimethylformamide to provide a solution having a concentration of 0.4 g/100 ml, and thereafter the reduced viscosity is determined from the time of flow measured at 30° C. by use of a Cannon-Fenske viscometer tube.

The graft copolymer (B) obtained as described above usually contains not only mainly a grafted polymer (b1 component) where the monomer component including an aromatic vinyl-based monomer is grafted to the rubbery polymer, but also a copolymer (b2 component) obtained by copolymerization with a monomer component including an aromatic vinyl-based monomer not grafted to the rubbery polymer. Therefore, in the present invention, the graft copolymer (B), if including the b2 component, means containing a copolymer (C).

The copolymer (C) is obtained by polymerization of a monomer component including an aromatic vinyl-based monomer and a vinyl cyanide-based monomer.

Examples of the aromatic vinyl-based monomer forming the copolymer (C) include styrene, α-methylstyrene, para-methylstyrene, and bromostyrene, and such monomers can be used singly or in combinations of two or more kinds thereof. In particular, styrene and α-methylstyrene are preferable.

Examples of the vinyl cyanide-based monomer forming the copolymer (C) include acrylonitrile, methacrylonitrile, ethacrylonitrile, and fumaronitrile, and such monomers can be used singly or in combinations of two or more kinds thereof. In particular, acrylonitrile is preferable.

The copolymer (C) may further include other monomer copolymerizable with the aromatic vinyl-based monomer and the vinyl cyanide-based monomer, examples of such other monomer include a (meth)acrylate-based monomer, an amide-based monomer, and an unsaturated carboxylic acid-based monomer, and such monomers can be used singly or in combinations of two or more kinds thereof. Examples of the (meth)acrylate-based monomer can include methyl (meth)acrylate, ethyl (meth)acrylate, propyl (meth)acrylate, butyl (meth)acrylate, 2-ethylhexyl (meth) acrylate, phenyl (meth) acrylate, 4-t-butylphenyl (meth)acrylate, (di)bromophenyl (meth)acrylate, and chlorophenyl (meth)acrylate, examples of the amide-based monomer can include acrylamide, and methacrylamide, and examples of the unsaturated carboxylic acid-based monomer can include acrylic acid, methacrylic acid, maleic acid, fumaric acid, and itaconic acid.

The compositional ratio of the monomer forming the copolymer (C) is not particularly limited, and examples thereof include a compositional ratio of 50 to 90% by mass of the aromatic vinyl-based monomer, 10 to 50% by mass of the vinyl cyanide-based monomer and 0 to 40% by mass of other copolymerizable monomer, and a compositional ratio of 20 to 70% by mass of the aromatic vinyl-based monomer, 10 to 60% by mass of the vinyl cyanide-based monomer, 20 to 70% by mass of the (meth)acrylate-based monomer and 0 to 50% by mass of other copolymerizable monomer. In particular, the content of the vinyl cyanide-based monomer forming the copolymer (C) is preferably 25 to 45% by mass (particularly 30 to 40% by mass) in terms of plating deposition rate.

The reduced viscosity of the copolymer (C) is not particularly limited, and it is preferably 0.2 to 1.5 dl/g, more preferably 0.3 to 1.0 dl/g from the viewpoint of the balance between physical properties such as impact resistance and fluidity.

The reduced viscosity can be determined from the following method.

The copolymer (C) is dissolved in N,N-dimethylformamide to provide a solution having a concentration of 0.4 g/100 ml, and thereafter the reduced viscosity is determined from the time of flow measured at 30° C. by use of a Cannon-Fenske viscometer tube.

The polymerization method of the graft copolymer (B) and the copolymer (C) forming the resin composition for plating is not particularly limited, and such copolymers can be produced by, for example, an emulsification polymerization method, a suspension polymerization method, a solution polymerization method, a bulk polymerization method, and a combination method thereof.

The content of the polycarbonate resin (A) in the resin composition for plating of the present invention is needed to be 20 to 60% by mass, and is preferably 25 to 55% by mass, more preferably 30 to 50% by mass, based on 100% by mass of the total of the polycarbonate resin (A), the graft copolymer (B) and the copolymer (C). The content can be adjusted within the above range, thereby allowing the balance among impact resistance, fluidity and plating deposition rate to be enhanced.

The content of the copolymer obtained by graft polymerization of the aromatic vinyl-based monomer (in particular, aromatic vinyl-based monomer and vinyl cyanide-based monomer) to the rubbery polymer in the resin composition for plating of the present invention is preferably 5 to 30% by mass, more preferably 10 to 25% by mass, further preferably 15 to 20% by mass, based on 100% by mass of the total of the polycarbonate resin (A), the graft copolymer (B) and the copolymer (C). The content can be adjusted within the above range, thereby allowing the effect exerted by the present invention to be more enhanced. The content of the copolymer can be calculated from the graft ratio of the graft copolymer (B) and the mass of the rubbery polymer.

The content of the copolymer (excluding one obtained by graft polymerization to the rubbery polymer) of the aromatic vinyl-based monomer and the vinyl cyanide-based monomer in the resin composition for plating of the present invention is preferably 10 to 75% by mass, more preferably 20 to 65% by mass, further preferably 30 to 55% by mass, based on 100% by mass of the total of the polycarbonate resin (A), the graft copolymer (B) and the copolymer (C). The content can be adjusted within the above range, thereby allowing the effect exerted by the present invention to be more enhanced. The content of the copolymer can be calculated as a mass obtained by determining the masses of an aromatic vinyl-based monomer and a vinyl cyanide-based monomer not grafted to the rubbery polymer based on the graft ratio of the graft copolymer (B) and adding the content of the copolymer (C) thereto.

The content of the rubbery polymer in the resin composition for plating of the present invention is needed to be 7 to 20% by mass, and is more preferably 10 to 15% by mass, further preferably 11 to 14% by mass, relative to the resin composition. The content can be adjusted within the above range, thereby allowing the balance between plating deposition rate and plating adhesion strength to be enhanced.

The total content of the aromatic vinyl-based monomer and the vinyl cyanide-based monomer forming the graft copolymer (B) and the copolymer (C) in the resin composition for plating of the present invention is preferably 20 to 73% by mass, more preferably 30 to 65% by mass, further preferably 36 to 59% by mass based on 100% by mass of the total of the polycarbonate resin (A), the graft copolymer (B) and the copolymer (C). The content can be adjusted within the above range, thereby allowing the balance between plating deposition rate and plating adhesion strength to be enhanced.

The content of an oligomer component in the resin composition for plating of the present invention is needed to be less than 1% by mass and is preferably less than 0.8% by mass, relative to the resin composition. The content can be adjusted within the above range, thereby allowing plating deposition rate to be enhanced. The oligomer component here includes a dimer and a trimer of the monomer(s) used in polymerization, included in the resin composition, and specific examples include a dimer of styrene, a dimer of acrylonitrile and styrene, a trimer of styrene, and a trimer of acrylonitrile and styrene.

The amount of the oligomer component (the amount of the oligomer) can be measured using gas chromatography under the following conditions.

<Preparation of Sample>

After 1 g of the resin composition is accurately weighed and is dissolved in 50 ml of N,N-dimethylformamide, the resulting solution is left to stand in a sealed container for 24 hours and thereafter is used as a measurement sample.

<Gas Chromatography Measurement Conditions>

Apparatus: Gas chromatograph GC-2010 manufactured by Shimadzu Corporation

Column name: DB-5 (liquid film thickness×length=0.25 µm×30 m)

Column temperature: the temperature is kept at 70° C. for 5 minutes, thereafter raised to 320° C. over 20 minutes, and kept for 9 minutes after reaching 320° C.

Amount of sample: 1 µl

Detector: FID

INJ temperature: 230° C.

DET temperature: 330° C.

Carrier gas: helium, 1.38 ml/min
Hydrogen: 40 ml/min
Air: 400 ml/min
<Quantitative Determination Method>

In an FID detector, a hydrocarbon component can be subjected to quantitative determination with calculation under the assumption that the relative molar sensitivity is almost directly proportional to the number of carbon atoms contained. An organic component containing any hetero atom(s) such as O, Cl, or N can also be subjected to quantitative determination with calculation of the relative molar sensitivity from the effective number of carbon atoms in a compound as proposed by Sternberg et al. A test liquid is obtained by weighing styrene so that the concentration of styrene in a solution in special grade DMF is 1000 ppm, and the relative molar sensitivity of each component relative to styrene is calculated according to the method and is used to thereby quantitatively determine the amounts of a dimer of styrene, a dimer of acrylonitrile and styrene, a trimer of styrene, and a trimer of acrylonitrile and styrene. One sample is subjected to measurement three times in the quantitative determination, and the average is defined as the content of the oligomer component in the resin composition.

The method of adjusting the content of the oligomer component is not particularly limited, a known method can be used, and examples include a method where each constituent resin reduced in the oligomer content is formulated, and a method where a degassing step in melt-kneading of the resin composition is increased and/or the degree of vacuum in degassing is increased. Examples of the method of reducing the oligomer content of each constituent resin include optimization of the monomer formulation in polymerization, a reduction in the temperature in polymerization, and optimization of the type and the amount of a catalyst added, in polymerization.

The resin composition for plating of the present invention can be mixed with other thermoplastic resin as long as the object of the present invention is not impaired. As such other thermoplastic resin, for example, an acrylic resin such as polymethyl methacrylate, a polybutylene terephthalate resin, a polyethylene terephthalate resin, a polyamide resin, an imide-based resin, or a polylactic acid resin can be used.

Furthermore, for example, a hindered amine-based light stabilizer, hindered phenol-based, sulfur-containing organic compound-based, and phosphorus-containing organic compound-based antioxidants, phenol-based and acrylate-based heat stabilizers, benzoate-based, benzotriazole-based, benzophenone-based, and salicylate-based ultraviolet absorbers, organic nickel-based and higher fatty acid amide-based lubricants, a plasticizer such as phosphate, a flame retardant and a flame retardant aid, such as a halogen-containing compound including polybromophenyl ether, tetrabromobisphenol-A, a brominated epoxy oligomer, and bromide, a phosphorus-based compound, and antimony trioxide, an odor masking agent, a pigment such as carbon black and titanium oxide, and a dye can also be added to the resin composition for plating of the present invention. Furthermore, a reinforcing agent and/or a filler, such as talc, calcium carbonate, aluminum hydroxide, glass fiber, glass flake, glass beads, glass wool, carbon fiber, and metallic fiber can also be added thereto.

The total content rate of the polycarbonate resin (A), the graft copolymer (B) and the copolymer (C) in the resin composition for plating of the present invention is preferably 50% by mass or more, more preferably 80% by mass or more, further preferably 90% by mass or more, particularly preferably 95% by mass or more, based on the total amount of the resin composition for plating. The content rate is 50% by mass or more, thereby more enhancing the effect exerted by the present invention.

The notched Charpy impact value (test piece thickness: 4 mm in thickness, measurement temperature: 23° C.) according to the ISO test method 179, of the resin composition for plating of the present invention, is preferably 5 to 90 kJ/m$^2$, more preferably 10 to 80 kJ/m$^2$. The value can be adjusted within the above range, thereby not only allowing impact resistance to be more excellent, but also allowing plating adhesion strength, plating deposition rate and thermal cycle resistance to be satisfied in a well-balanced manner.

The melt volume flow rate (MVF) under conditions of 220° C. and a load of 98.07 N according to the ISO test method 1133, of the resin composition for plating of the present invention, is preferably 6 to 30 cm$^3$/10 min, more preferably 8 to 27 cm$^3$/10 min. The value can be adjusted within the above range, thereby not only allowing fluidity to be more excellent, but also allowing plating adhesion strength, plating deposition rate and thermal cycle resistance to be satisfied in a well-balanced manner with.

Mixing of a resin containing the resin composition for plating can be performed by melt-kneading by use of a known kneading machine usually used, such as a roll, a Banbury mixer, an extruder, or a kneader.

While the resin composition for plating, thus obtained, can be molded by injection molding, extrusion, compression molding, injection compression molding, blow molding, or the like and the resulting resin molded article can be plated under the same conditions as those of a known plating method, for example, usual plating conditions of an ABS resin, the resin composition for plating is particularly preferably used in a direct plating method.

EXAMPLES

Hereinafter, the present invention will be specifically described with reference to Examples, but the present invention is not intended to be limited thereto at all. Herein, "part(s)" and "%" represented in Examples are on a mass basis. In addition, various physical properties in each Example and each Comparative Example were measured according to the following methods.
[Measurement and Evaluation]
Measurement of Amount of Oligomer Each resin composition obtained in Examples and Comparative Examples was subjected to measurement according to the above methods and conditions by use of gas chromatography.
Charpy Impact Strength (NC)

Each pellet obtained in Examples and Comparative Examples was used to form various test pieces according to the ISO test method 294, and the notched Charpy impact value was measured at a thickness of 4 mm according to the ISO test method 179. Unit: kJ/m$^2$
Melt Volume Flow Rate (MVR)

Each pellet obtained in Examples and Comparative Examples was used to measure the melt volume flow rate under conditions of 220° C. and a load of 98.07 N according to the ISO test method 1133. Unit: cm$^3$/10 min
Plating Adhesion Strength Each pellet obtained in Examples and Comparative Examples was formed into a flat plate molded article for plating (55×90×3 mm) with an injection molding machine, and the flat plate molded article was directly plated according to the following method and then a plated film was deposited. The adhesion strength of the plated film deposited was represented as a stress (N) at which a metallic film on the plated molded article, with cuttings reaching a substrate of the metallic film being made at intervals of 1 cm, was peeled in a vertical direction, according to JIS H-8630.

<Plate Processing Step>

The flat plate for plating was dipped in a CRP cleaner at 40° C. for 3 minutes, and subjected to degreasing. The flat plate after degreasing was washed with water at 30° C., and thereafter dipped in an etching liquid at 67° C. (chromic acid: 400 g/l, sulfuric acid: 200 cc/l) for 10 minutes or 15 minutes to perform etching. The flat plate after etching was washed with water at 30° C. for 2 minutes, and thereafter dipped in a CRP reducer at 25° C. for 3 minutes to perform a neutralization treatment. The flat plate after neutralization was washed with water at 30° C. for 2 minutes, and thereafter pre-dipped in hydrochloric acid at 25° C. for 1 minute and subsequently dipped in a CRP catalyst at 35° C. for 6 minutes, to perform a Pd—Sn colloidal catalyzation treatment. The flat plate after catalyzation was washed with water at 30° C. for 2 minutes, and thereafter dipped in CRP selectors A and B at 45° C. for 3 minutes, to perform a conductivity-imparting treatment. The flat plate subjected to the conductivity-imparting treatment was washed with water at 30° C. for 2 minutes, and thereafter a current having a current density of 3 A/dm$^2$ was applied to an electrolytic copper plating bath using CRP copper at 25° C. for 2 hours, to deposit an electrolytic copper plated film having a thickness of 50 μm on the flat plate. The flat plate after electrolytic copper plating was washed with water at 30° C., and thereafter the flat plate subjected to electrolytic copper plating was aged at 80° C. for 2 hours and left to stand overnight.

Plating Deposition Rate

Each pellet obtained in Examples and Comparative Examples was formed into a flat plate molded article for plating (55×90×3 mm) with an injection molding machine, a cutting having a width of 1 mm and a length of 45 mm was made side-to-side in a shorter side direction at positions every 9 mm in a longer side direction, to prepare a wave-shaped flat plate, the flat plate was directly plated according to the following method, and thereafter the degree of deposition on the plated film was rated according to the following rating criteria by visually determining the degree of the occurrence of an unplated portion (skip) in the course of deposition.

○: favorable without any skip.
 Δ: skip partially observed.
 x: poor with skip fully observed.

<Plate Processing Step>

The flat plate for plating was dipped in a CRP cleaner at 40° C. for 3 minutes, and subjected to degreasing. The flat plate after degreasing was washed with water at 30° C., and thereafter dipped in an etching liquid at 67° C. (chromic acid: 400 g/l, sulfuric acid: 200 cc/l) for 10 minutes to perform etching. The flat plate after etching was washed with water at 30° C. for 2 minutes, and thereafter dipped in a CRP reducer at 25° C. for 3 minutes to perform a neutralization treatment. The flat plate after neutralization was washed with water at 30° C. for 2 minutes, and thereafter pre-dipped in hydrochloric acid at 25° C. for 1 minute and subsequently dipped in a CRP catalyst at 35° C. for 6 minutes, to perform a Pd—Sn colloidal catalyzation treatment. The flat plate after catalyzation was washed with water at 30° C. for 2 minutes, and thereafter dipped in CRP selectors A and B at 45° C. for 3 minutes, to perform a conductivity-imparting treatment. The flat plate subjected to the conductivity-imparting treatment was washed with water at 30° C. for 2 minutes, and thereafter a current having a current density of 2 A/dm$^2$ was applied to an electrolytic copper plating bath using CRP copper at 25° C. for 5 minutes, to deposit an electrolytic copper plated film on the flat plate.

Thermal Cycle Resistance

Each pellet obtained in Examples and Comparative Examples was formed into a flat plate molded article for plating (55×90×3 mm) with an injection molding machine, the flat plate molded article was directly plated according to the following method, and thereafter the environment temperature was changed in the following order: −30° C. (1 hour)→23° C. (0.5 hours)→80° C. (1 hour)→23° C. (0.5 hours). Such an operation was performed for 10 cycles, and thereafter the presence of failures such as swelling was visually determined with respect to the appearance of each plated molded article, and rated according to the following rating criteria.

○: favorable without any plating swelling/cracking.
 Δ: plating swelling/cracking partially observed.
 x: poor with plating swelling/cracking fully observed.

<Plate Processing Step>

The flat plate for plating was dipped in a CRP cleaner at 40° C. for 3 minutes, and subjected to degreasing. The flat plate after degreasing was washed with water at 30° C., and thereafter dipped in an etching liquid at 67° C. (chromic acid: 400 g/l, sulfuric acid: 200 cc/l) for 10 minutes to perform etching. The flat plate after etching was washed with water at 30° C. for 2 minutes, and thereafter dipped in a CRP reducer at 25° C. for 3 minutes to perform a neutralization treatment. The flat plate after neutralization was washed with water at 30° C. for 2 minutes, and thereafter pre-dipped in hydrochloric acid at 25° C. for 1 minute and subsequently dipped in a CRP catalyst at 35° C. for 6 minutes, to perform a Pd—Sn colloidal catalyzation treatment. The flat plate after catalyzation was washed with water at 30° C. for 2 minutes, and thereafter dipped in CRP selectors A and B at 45° C. for 3 minutes, to perform a conductivity-imparting treatment. The flat plate subjected to the conductivity-imparting treatment was washed with water at 30° C. for 2 minutes, and thereafter a current having a current density of 2 A/dm$^2$ was applied to an electrolytic copper plating bath using CRP copper at 25° C. for 15 minutes, to deposit a 15-μm electrolytic copper plated film on the flat plate. Subsequently, a semi-gloss nickel film: 6 μm, a gloss nickel film: 4 μm, and a chromium-plated film: 0.1 to 0.3 μm were deposited in a common decorative electroplating process.

Polycarbonate Resin (A)

Polycarbonate resin (A): polycarbonate resin made of phosgene and bisphenol A, having a viscosity average molecular weight of 20,500.

Production of Graft Copolymer (B)

A glass reactor was charged with 50 parts by mass of styrene-butadiene rubber latex swollen by agglomeration (mass average particle size: 0.25 μm), in terms of the solid content, stirring was initiated, and purging with nitrogen was performed. After the purging with nitrogen, the temperature in the reactor was raised to reach 65° C., and immediately thereafter, an aqueous solution in which 0.2 parts by mass of lactose, 0.1 parts by mass of anhydrous sodium pyrophosphate and 0.005 parts by mass of ferrous sulfate were dissolved in 10 parts by mass of deionized water was added, and then heated to 70° C. Thereafter, an aqueous emulsifier solution in which a mixed liquid of 15 parts by mass of acrylonitrile, 35 parts by mass of styrene, 0.05 parts by mass of tert-dodecylmercaptan and 0.3 parts by mass of cumene hydroperoxide, and 1.0 part by mass of potassium oleate were dissolved in 20 parts by mass of deionized water was continuously dropped over 4 hours. After the dropping, the resultant was retained for 3 hours to provide graft copolymer latex. Thereafter, salting-out, dewatering, and drying were made to provide a powder of graft copolymer (B). The graft ratio of the resulting graft copolymer (B) was 37.0%, and the reduced viscosity of the acetone-soluble fraction was 0.39 dl/g. The mass average particle size of the styrene-butadiene rubber latex agglomerated was determined as follows.

Dyeing was made by osmium tetraoxide ($OsO_4$), and an image was taken by a transmission-type electron microscope after drying. An image processor (apparatus name: IP-1000PC manufactured by Asahi Kasei Corporation) was used to measure the area with respect to 800 rubber particles, thereby determining the equivalent circle diameter (diameter), and the mass average particle size was calculated.

Production of Copolymer (C-1)

A mixed solution in which 33 parts of acrylonitrile, 67 parts of styrene, 15 parts of ethylbenzene as a solvent, 0.021 parts of 1,1-di (t-butylperoxy)cyclohexane (10-hour half-life temperature: 90.7° C.) as an initiator and 0.15 parts of t-dodecylmercaptan as a chain transfer agent were used was prepared, and cooled to 5° C. or less and stored. The mixed solution prepared was continuously fed at 1.44 kg/hr to a 20 L-volume reactor which was kept at a reaction temperature of 127° C. and which was provided with a double helical ribbon blade, to perform polymerization. A mixed solution including a copolymer was continuously extracted by a pump at the same rate as the feed rate and sent to a gas-liquid separation apparatus kept at 289° C. and 45 torr, and thus separated to the copolymer and an unreacted solution. The copolymer separated was pelletized to thereby provide copolymer (C-1). The polymerization rate in stabilization of polymerization was 51%, and the copolymer at the polymerization rate was used for evaluation of physical properties.

Production of Copolymer (C-2)

A mixed solution in which 27 parts of acrylonitrile, 73 parts of styrene, 12 parts of ethylbenzene as a solvent, 0.018 parts of 1,1-di (t-hexylperoxy)cyclohexane (10-hour half-life temperature: 86.7° C.) as an initiator and 0.33 parts of t-dodecylmercaptan as a chain transfer agent were used was prepared, and cooled to 5° C. or less and stored. The mixed solution prepared was continuously fed at 1.52 kg/hr to a 20 L-volume reactor which was kept at a reaction temperature of 125° C. and which was provided with a double helical ribbon blade, to perform polymerization. A mixed solution including a copolymer was continuously extracted by a pump at the same rate as the feed rate and sent to a gas-liquid separation apparatus kept at 285° C. and 45 torr, and thus separated to the copolymer and an unreacted solution. The copolymer separated was pelletized to thereby provide copolymer (C-2). The polymerization rate in stabilization of polymerization was 45%, and the copolymer at the polymerization rate was used for evaluation of physical properties.

Production of Copolymer (C-3)

A mixed solution in which 29 parts of acrylonitrile, 71 parts of styrene, 16 parts of ethylbenzene as a solvent, 0.025 parts of t-butyl cumyl peroxide (10-hour half-life temperature: 119.5° C.) as an initiator and 0.39 parts of t-dodecylmercaptan as a chain transfer agent were used was prepared, and cooled to 5° C. or less and stored. The mixed solution prepared was continuously fed at 1.32 kg/hr to a L-volume reactor which was kept at a reaction temperature of 155° C. and which was provided with a double helical ribbon blade, to perform polymerization. A mixed solution including a copolymer was continuously extracted by a pump at the same rate as the feed rate and sent to a gas-liquid separation apparatus kept at 260° C. and 45 torr, and thus separated to the copolymer and an unreacted solution. The copolymer separated was pelletized to thereby provide copolymer (C-3). The polymerization rate in stabilization of polymerization was 56%, and the copolymer at the polymerization rate was used for evaluation of physical properties.

Examples 1 to 8 and Comparative Examples 1 to 5

After the polycarbonate resin (A), the graft copolymer (B) and the copolymer (C) were mixed at each mixing ratio described in Table 1, the mixture was molten and kneaded by a φ35-mm twin-screw extruder set to a cylinder temperature of 250° C. under conditions of a rotation speed of a main screw, of 300 rpm, and an amount of discharge of 15 kg/hr, and pelletized. The resulting pellet was used to measure the content of the oligomer component. This pellet was formed into a test piece for measurement of physical properties and a flat plate for plating, with an injection molding machine (cylinder temperature; 250° C., mold temperature: 60° C.). Next, the test piece and the flat plate were used to measure physical properties, and plating adhesion strength, plating deposition rate and thermal cycle resistance. The results are shown in Table 1.

TABLE 1

| | | Example | | | | | | | | Comparative Example | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Polycarbonate resin (A) | | 20 | 30 | 40 | 40 | 40 | 40 | 50 | 60 | 15 | 40 | 40 | 40 | 70 |
| Graft copolymer (B) | | 25 | 25 | 25 | 16 | 36 | 25 | 25 | 25 | 25 | 10 | 50 | 25 | 25 |
| Copolymer (C) | C-1 | | | 45 | | 44 | | 35 | | | | 15 | | |
| | C-2 | 55 | | 35 | | | 24 | | 25 | 60 | 50 | 10 | | 5 |
| | C-3 | | | | | | | | | | | | 35 | |
| | Oligomer content (% by mass) | 0.7 | 0.6 | 0.4 | 0.6 | 0.3 | 0.5 | 0.5 | 0.5 | 0.7 | 0.6 | 0.5 | 1.6 | 0.4 |
| Evaluation items | Conditions and the like | | | | | | | | | | | | | |
| NC (kJ/m$^2$) | 23° C. | 15 | 23 | 65 | 35 | 68 | 60 | 72 | 43 | 8 | 25 | 81 | 60 | 50 |
| MVR (cm$^3$/10 minutes) | 220° C. · 98.07N | 25 | 20 | 15 | 18 | 8 | 13 | 11 | 9 | 33 | 20 | 5 | 13 | 3 |
| Plating adhesion strength (N) | Etching: 10 minutes | 11 | 11 | 12 | 9 | 13 | 13 | 10 | 9 | 12 | 3 | 9 | 11 | 6 |
| | Etching: 15 minutes | 12 | 12 | 11 | 10 | 13 | 13 | 11 | 10 | 13 | 4 | 5 | 11 | 5 |

TABLE 1-continued

|  |  | Example | | | | | | | | Comparative Example | | | | |
| --- | --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 | 5 |
| Plating deposition rate | Visual determination | ○ | ○ | ○ | ○-Δ | ○ | ○ | ○ | ○ | ○ | Δ | Δ | Δ | x |
| Thermal cycle resistance | Visual determination | ○ | ○ | ○ | ○ | ○-Δ | ○ | ○ | ○ | ○ | Δ | x | x | ○ |

As clear from Table 1, in all Examples 1 to 8 where the resin composition for plating of the present invention was used, molded articles excellent in impact resistance and fluidity, and satisfying plating adhesion strength, plating deposition rate and thermal cycle resistance in a well-balanced manner were obtained.

In Comparative Example 1, the amount of the polycarbonate resin (A) did not reach the lower limit defined in the present invention, and therefore impact resistance was inferior.

In Comparative Example 2, the content of the rubbery polymer did not reach the lower limit defined in the present invention, and therefore plating adhesion strength, plating deposition rate and thermal cycle resistance were inferior.

In Comparative Example 3, the content of the rubbery polymer exceeded the upper limit defined in the present invention, and therefore fluidity, plating deposition rate and thermal cycle resistance were inferior.

In Comparative Example 4, the oligomer content exceeded the upper limit defined in the present invention, and therefore plating deposition rate and thermal cycle resistance were inferior.

In Comparative Example 5, the amount of the polycarbonate resin (A) exceeded the upper limit defined in the present invention, and therefore fluidity, plating adhesion strength and plating deposition rate were inferior.

INDUSTRIAL APPLICABILITY

As described above, the resin composition for plating of the present invention is excellent in impact resistance and fluidity and satisfies plating adhesion strength, plating deposition rate and thermal cycle resistance in a well-balanced manner, and therefore can be used in various applications such as parts for interior and exterior decoration of automobiles, according to market needs.

The invention claimed is:

1. A method for enhancing the plating property of a molded product, which comprises providing a resin composition,
    wherein the resin composition for plating comprises a polycarbonate resin (A), a graft copolymer (B) and a copolymer (C), and satisfies the following conditions (1) to (5):
    (1) a content of the polycarbonate resin (A) is 20 to 55% by mass based on 100% by mass of a total of (A), (B) and (C);
    (2) the graft copolymer (B) is a graft copolymer obtained by graft polymerization of a rubbery polymer and styrene and acrylonitrile;
    (3) the copolymer (C) is a copolymer obtained by polymerization of styrene and acrylonitrile;
    (4) a content of the rubbery polymer is 7 to 20% by mass relative to the resin composition; and
    (5) a total content of oligomer components being measured at INJ temperature of 230° C. using gas chromatography are a dimer of styrene, a dimer of acrylonitrile and styrene, a trimer of styrene, and a trimer of acrylonitrile and styrene is less than 1% by mass relative to the resin composition,
    wherein the content of the copolymer obtained by graft polymerization of styrene and acrylonitrile to the rubbery polymer, which is the content of the graft copolymer (B) minus the content of styrene and acrylonitrile that are not grafted to the rubbery polymer, is 5 to 30% by mass of the total of the polycarbonate resin (A), the graft copolymer (B) and the copolymer (C),
    wherein the content of the copolymer (excluding one obtained by graft polymerization to the rubbery polymer) of styrene and acrylonitrile, which is the content of the copolymer (C) plus the content of a copolymer of styrene and acrylonitrile that are not grafted to the rubbery polymer, is 20 to 75% by mass of the total of the polycarbonate resin (A), the graft copolymer (B) and the copolymer (C).

2. The method according to claim 1, wherein the content of the polycarbonate resin (A) is 30 to 50% by mass based on 100% by mass of the total of (A), (B) and (C).

3. The method according to claim 1, wherein the content of the rubbery polymer is 10 to 15% by mass relative to the resin composition.

4. The method according to claim 1, wherein a content of acrylonitrile forming the copolymer (C) is 30 to 40% by mass relative to the copolymer (C).

5. The method according to claim 1, wherein the method additionally enhances the plating deposition rate and the thermal cycle resistance of a molded product, which method comprises providing the resin composition.

6. The method according to claim 1, wherein the content of the graft copolymer (B) is 25 to 30% by mass based on 100% by mass of the total of (A), (B) and (C).

7. The method according to claim 1, wherein the content of the copolymer (C) is 25 to 55% by mass based on 100% by mass of the total of (A), (B) and (C).

8. The method according to claim 1,
    wherein the content of the polycarbonate resin (A) is 25 to 55% by mass based on 100% by mass of the total of (A), (B) and (C),
    the content of the graft copolymer (B) is 25 to 30% by mass based on 100% by mass of the total of (A), (B) and (C), and
    the content of the copolymer (C) is 25 to 55% by mass based on 100% by mass of the total of (A), (B) and (C).

9. The method according to claim 1, wherein the total content of styrene and acrylonitrile forming the graft copolymer (B) and the copolymer (C) is 30 to 73% by mass relative to the resin composition.

10. The method according to claim 1, wherein the content of the rubbery polymer in the resin composition is 12.5 to 14% by mass.

11. The method according to claim 1, wherein the content of the rubbery polymer in the graft copolymer (B) is 40 to 50% by mass.

12. The method according to claim 1, wherein the melt volume flow rate of the resin composition under conditions of 220° C. and a load of 98.07 N is 11 to 30 cm$^3$/10 min.

13. The method according to claim 1, wherein the graft ratio of the graft copolymer (B) is 20 to 75%.

14. The method according to claim 1, wherein the reduced viscosity of acetone-solubles of the graft copolymer (B) is 0.2 to 1.5 dl/g.

15. The method according to claim 1, wherein the notched Charpy impact value of the resin composition is 5 to 90 KJ/m$^2$.

* * * * *